United States Patent
Marcotulli

(10) Patent No.: US 12,338,694 B2
(45) Date of Patent: *Jun. 24, 2025

(54) OFF SHORE RIGID STEEL RISER TERMINATION AND FIXATION SYSTEM TO FLOATING PRODUCTION STORAGE OFFLOADING (FPSO) VESSEL

(71) Applicant: SAIPEM S.P.A., Milan (IT)

(72) Inventor: Amedeo Marcotulli, Milan (IT)

(73) Assignee: SAIPEM S.P.A., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 18/560,336

(22) PCT Filed: Apr. 7, 2022

(86) PCT No.: PCT/IB2022/053268
§ 371 (c)(1),
(2) Date: Nov. 10, 2023

(87) PCT Pub. No.: WO2022/238778
PCT Pub. Date: Nov. 17, 2022

(65) Prior Publication Data
US 2024/0229576 A1    Jul. 11, 2024

(30) Foreign Application Priority Data

May 13, 2021 (IT) .................. 102021000012317

(51) Int. Cl.
*E21B 19/00* (2006.01)
*E21B 43/01* (2006.01)

(52) U.S. Cl.
CPC ........ *E21B 19/004* (2013.01); *E21B 43/0107* (2013.01)

(58) Field of Classification Search
CPC ... E21B 19/004; E21B 43/0107; E21B 17/085

(Continued)

(56) References Cited

U.S. PATENT DOCUMENTS

| 5,947,642 A | 9/1999 | Teixeira |
|---|---|---|
| 7,467,914 B2 | 12/2008 | Finn |

(Continued)

FOREIGN PATENT DOCUMENTS

| BR | PI0 505 400 A | 9/2007 |
|---|---|---|
| WO | 2017095551 A1 | 6/2017 |

OTHER PUBLICATIONS

Gouveia, Joao, et al: "Steel Catenary Risers (SCRs): From Design to Installation of the First Reeled CRA Lined Pipes. Part I—Risers Design", All Days, May 4, 2015, XP055876250, DOI: 10.4043/25839-MS. Retrieved from Internet; URL: http://onepetro.org/OTCONF/proceedings-pdf/doi/10.4043/25839-MS/1360507/otc-25839-ms.pdf.

(Continued)

*Primary Examiner* — Matthew Troutman
*Assistant Examiner* — Patrick F Lambe
(74) *Attorney, Agent, or Firm* — Merchant & Gould P.C.

(57) ABSTRACT

A riser termination connecting a steel riser duct to an I-tube or J-tube connecting interface of a floating unit has an upper hang off portion, lower coupling adapter, steel termination conduit having an upper conduit end rigidly connected to the upper hang off portion, and lower conduit end connected to an adjacent conduit section of the riser duct. The termination conduit extends axially slidable through the coupling adapter. A cylindrical bearing seat inside the coupling adapter defines a bearing seat diameter and axis. An annular rounded bearing body has a bearing body diameter and protrudes outward from the termination conduit inside the bearing seat, the bearing body diameter being smaller than the bearing seat diameter to provide a unilateral gap and allow relative axial sliding and rotation. The termination conduit includes a variable cross-section portion having an (Continued)

external diameter and wall thickness tapering from the bearing body.

15 Claims, 7 Drawing Sheets

(58) Field of Classification Search
USPC .......................................................... 166/345
See application file for complete search history.

(56) References Cited

U.S. PATENT DOCUMENTS

| | | | |
|---|---|---|---|
| 8,474,539 B2* | 7/2013 | Luo .................... | E21B 19/004 |
| | | | 166/344 |
| 10,053,929 B2* | 8/2018 | Spears ................ | E21B 17/017 |
| 10,597,952 B2 | 3/2020 | Otten | |
| 2007/0056741 A1* | 3/2007 | Finn .................... | E21B 17/015 |
| | | | 166/367 |
| 2019/0032428 A1* | 1/2019 | Askestad ............ | E21B 17/05 |
| 2021/0348455 A1* | 11/2021 | Amorim ............. | E21B 19/006 |

OTHER PUBLICATIONS

Baxter, Carl F., et al: "Experience and Guidance in the Use of Titanium Components in Steel Catenary Riser Systems", All Days, Apr. 30, 2007, XP055876252, DOI: 10.4043/18624-MS, Retrived from the Internet; URL: Http://onepetro.org/OTCONF/proceedings-pdf/doi/10.4043/18624-MS/1833308/otc-18624-ms.pdf.
International Search Report and Written Opinion received for PCT Serial No. PCT/IB2022/053268 on May 11, 2022, 13 pgs.

* cited by examiner

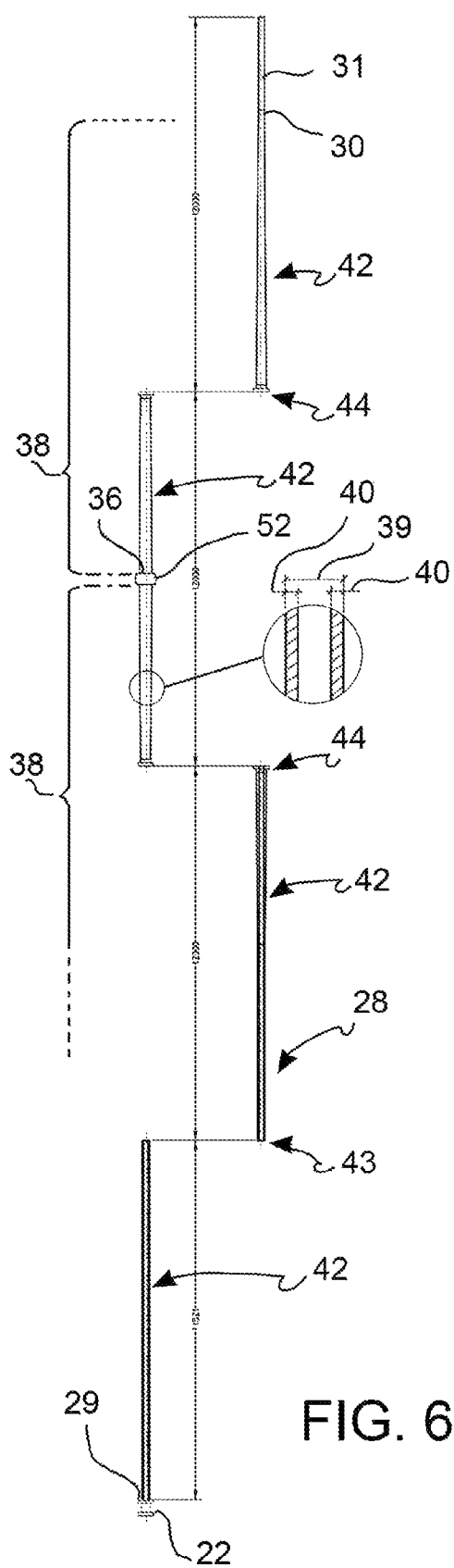
FIG. 6
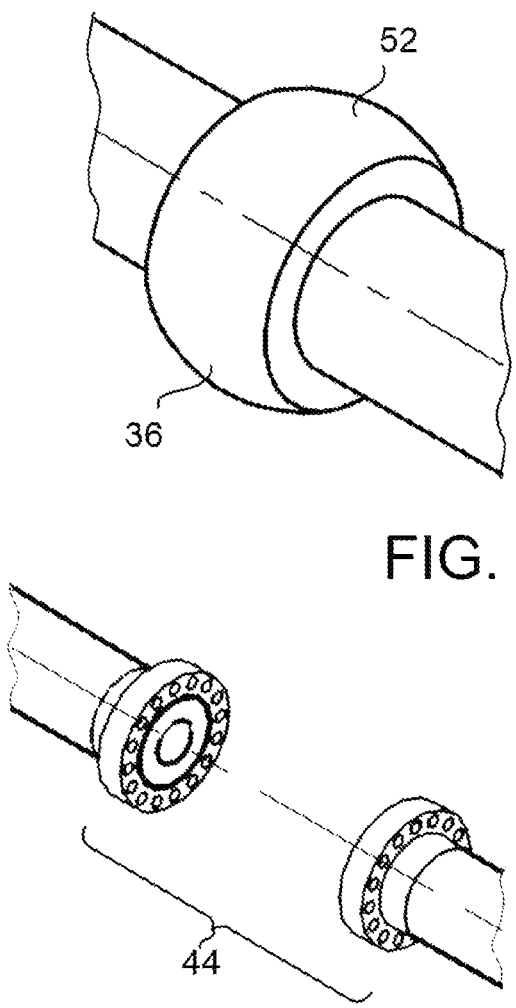
FIG. 7
FIG. 8
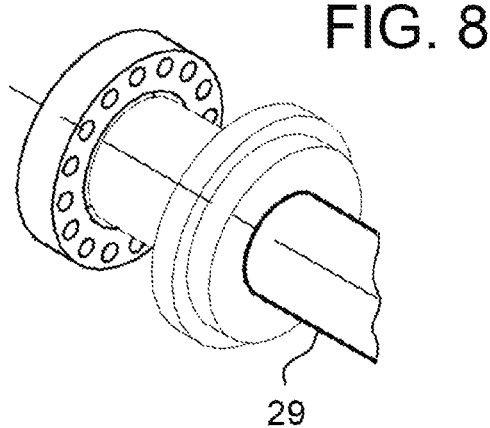
FIG. 9

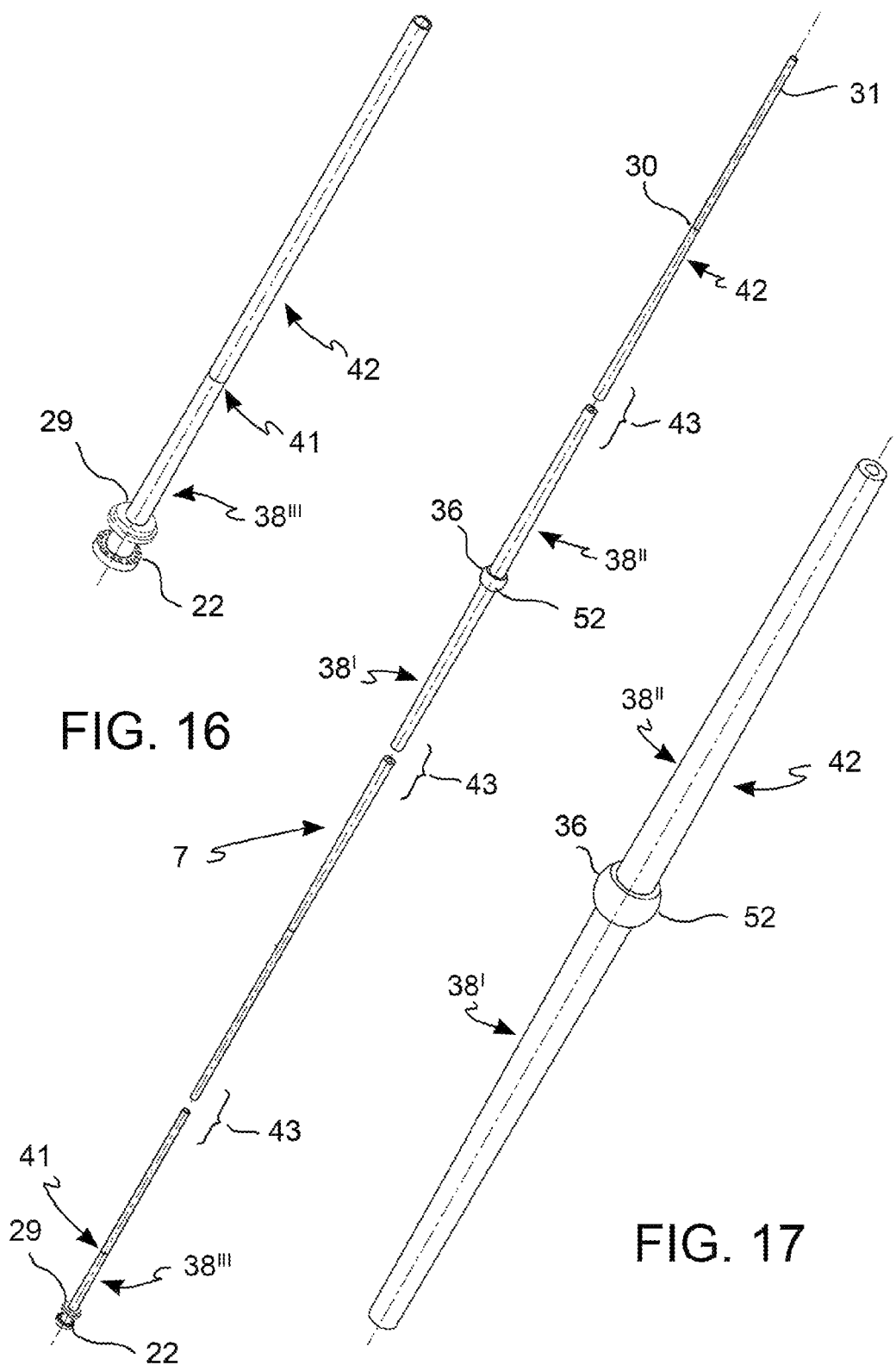

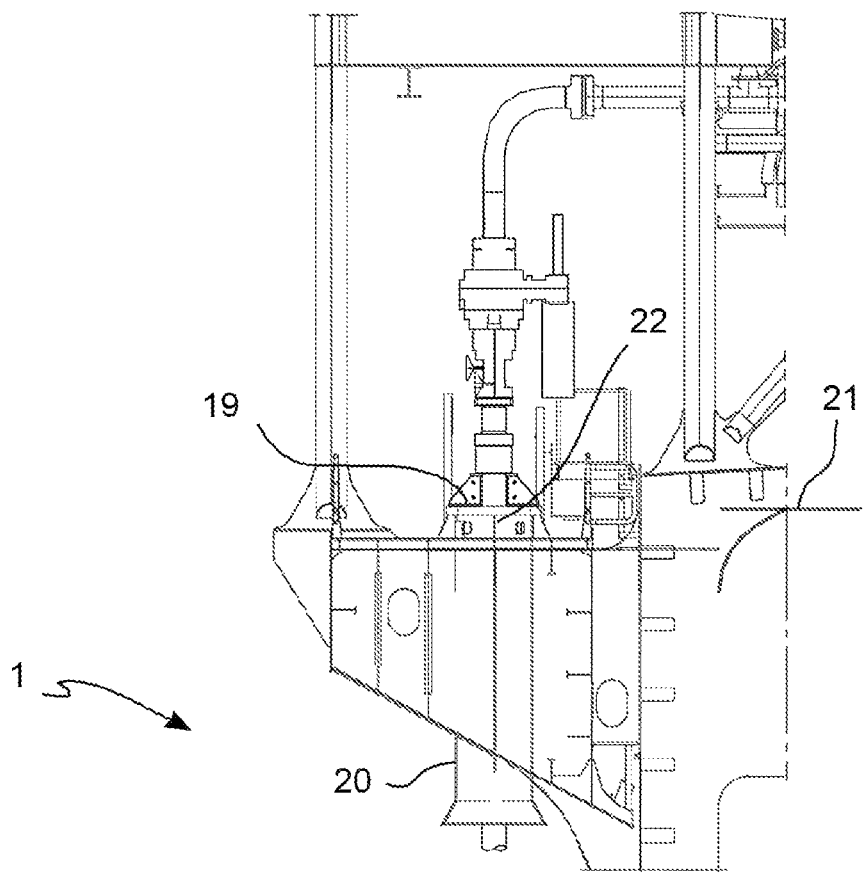
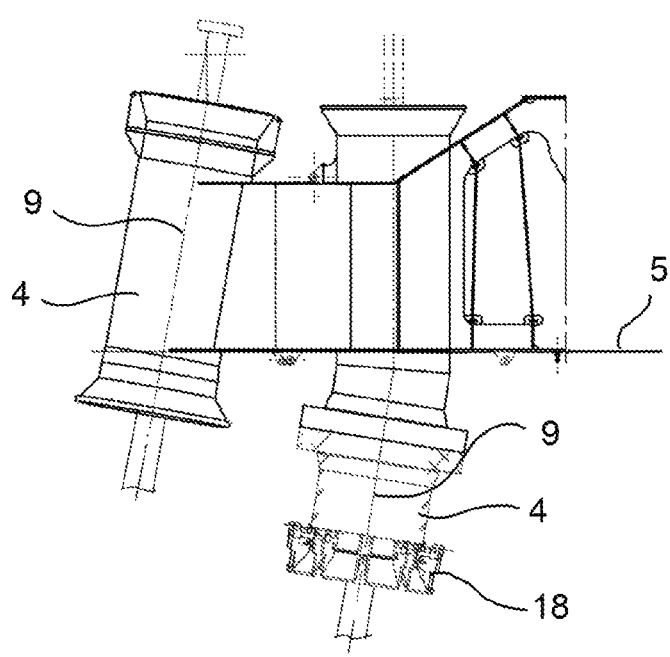
FIG. 18

OFF SHORE RIGID STEEL RISER TERMINATION AND FIXATION SYSTEM TO FLOATING PRODUCTION STORAGE OFFLOADING (FPSO) VESSEL

CROSS-REFERENCE TO RELATED APPLICATIONS

The present application is a National Stage Filing of PCT International Application No. PCT/IB2022/053268 filed on Apr. 7, 2022, which claims benefit of priority to Italian Patent Application No. 102021000012317, filed on May 13, 2021, and which applications are incorporated herein by reference. To the extent appropriate, a claim of priority is made to each of the above disclosed applications.

TECHNICAL FIELD

The present invention relates to an off shore rigid steel riser termination and fixation system for coupling a rigid steel riser to an I-tube coupling interface originally provided for flexible riser attachment with a Floating Production Storage Offloading ("FPSO") vessel.

More specifically, the invention relates to an improved structure for the connection of the upper part of a Steel Catenary Riser ("SCR") to a floater, for example a floating monohull vessel, typically an FPSO species.

The terminology "SCR" includes all metallic rigid risers with a catenary shape, particularly single catenaries (SCR) and double catenaries (SLWR), in which the metal wall of the riser performs both structural and impermeability functions, in contrast to multilayer composite flexible risers.

SUMMARY OF THE INVENTION

In a typical configuration of deep-sea oil and gas production systems an assembly of valves and fittings used to regulate the inflow and outflow of products from and to a well, so called trees, are positioned on the seabed and floating units, so-called Floating Production Storage Offloading ("FPSO") facilities, are positioned at sea level. The trees are fluidically connected with the Floating Production Storage Offloading ("FPSO") facilities by rigid or flexible oil or gas conveying pipes, the so-called risers, which extend from the seabed up to sea level.

This configuration allows increased flexibility in field layouts, such as multiple individual wells and multiple drill centers, and reduces the interferences within the main field construction phases: drilling, pipelay and FPSO fabrication. Once the underwater exploitation field has been completed, the floating (FPSO) unit can approach its target location, where the floating unit is anchored by means of a mooring that is normally pre-installed on the seabed. Then the upper ends of the risers are moved toward and connected to the floating unit (FPSO) to transport the petroleum product from the wells to the floating unit FPSO.

On the other hand, it is increasingly frequent to use or embody the risers as so-called service lines for transporting methanol or other chemical products to guarantee the flow of the petroleum product (flow assurance), or for transporting injection water for water injection in the subsea soil to increase the extraction rate of the oil or gas product in the well, that service fluid transport taking place from the floating (FPSO) unit downward towards the wells.

The configuration in which the above mentioned assembly of valves and fittings ("trees") are arranged on the sea bed (so called wet trees configuration) allows a great freedom of movement of the floating (FPSO) units compared to a configuration in which the assembly of valves and fittings is arranged on the floating unit at sea level (so-called dry trees configuration). This allows to use common floaters, e.g. standard ships such as Suezmax, Panamax, which are adapted to accommodate the oil plants, and which are anchored by means of a specific mooring system which, depending on local weather and sea conditions, can be fixed (e.g. a so called spread mooring) or rotating (e.g. a so-called turret mooring).

The movements of the FPSO are linked to those of the riser and movements and stresses are transmitted between these two structural sub-systems, differently between configurations in which the risers hang from the floater (so-called "hang off risers" which are relevant for the present invention) and configurations in which the risers are free from the FPSO (so-called "free standing riser" which are less relevant for the present invention). The movements of the FPSO induce mechanical stresses in the riser which combine with the corrosive and chemical actions thereon. Particular critical regions are the upper coupling of the riser (hang off region) as well as the support region of the riser on the seabed (touch down point).

To withstand the dynamic mechanical loads, the internal fluid loads and the corrosive and chemical attack, the risers are usually made of carefully selected materials or material combinations, such as e.g. metallic materials for rigid risers, multiple composite material layers for flexible risers, so-called umbilical duct structures with dedicated ducting tubes (umbilical) inside an external protection tube, or composite polymeric material in pipes that are used in particularly challenging projects.

Among the known possible shape and boundary conditions of the risers, there are to be listed the simple catenary shape (so-called Steel Catenary Riser "SCR") or multiple and compound catenary shapes, such as e.g. the so-called steel lazy wave catenary riser (SWLR) or the dormant riser, in which the tension of the upper portion of the riser is reduced at the expense of an increased length.

The structural hang-off interface between the riser and the floating unit, which is a relevant issue for the present invention, must withstand and influence in a desired manner the dynamics, forces and movements of the two sub-systems. Moreover, specific transfer systems and equipment is provided on the floating unit which move, hold, guide and manipulate the upper riser end to facilitate a rapid installation of the upper riser end at the floating unit without taking up precious space for the oil and gas process plants.

Such known hang-off interfaces include in particular the so-called I-tube interfaces.

In the I-tube support mode (which is relevant for the present invention) the upper end of the flexible riser forms a flexible joint portion to which an additional coupling adapter is connected, whereas a receptacle fixed on the floating unit forms a circumferentially closed tube section having an upper enlarged edge and a lower enlarged edge (therefore the name "I-tube"), into which the upper end of the riser is inserted from below until the coupling adapter is above the upper edge of the I-tube. Subsequently, in order to lock the adapter with respect to the I-tube, a locking lever mechanism at said upper edge must be activated so that locking levers of the locking lever mechanism move in between the coupling adapter and the I-tube and prevent the locking adapter from returning downwards and, hence, the flexible riser from slipping downward out of the I-tube.

The necessary pulling of the riser upper end portion into the I-tube is carried out by means of a pulling cable which is inserted through the I-tube and can be additionally guided and redirected by means of redirecting pulleys installed on the floating unit above the I-tube.

The necessary transfer systems and riser manipulation equipment include e.g. pulling devices such as winches, cables, chains, pulling heads.

Further installation aids integrated in the floating unit (vessel) include e.g.:
- a pulling system positioned on the deck of the vessel and having a system of redirecting pulleys,
- a pulling system positioned on a main deck of the vessel in which the main deck is cantilevered, and/or
- a pulling system suspended from the vessel side wall, like a balcony, having sledges for moving the pulling system in the position of use thereof,
- a pulling system mounted on a deck mounted rotating slide (so-called rotating turret).

A known off-shore flexible riser fixation method used for turret moored FPSO involves the following steps:
- A) A messenger cable is extended through each I-tube, with a first end exiting the upper opening of the I-tube and a second end exiting the lower opening of the I-tube and extending outside the floating unit (FPSO),
- B) the first end of the messenger cable is connected to the head of a pull cable,
- C) a construction vessel, different from the floating unit (FPSO) enters the field and holds the upper end of a riser in the riser laying tower, the upper end of the riser being already equipped with a pulling head and a triplate,
- D) the second end of the messenger cable is passed from the floating unit to the construction vessel,
- E) the head of the pull cable is moved from the platform to the construction vessel, F) the pull cable is connected to an abandonment cable and to the triplate at the riser,
- G) the riser is lowered down the laying tower of the construction vessel and a load passage is made from the abandonment cable to the pulling cable,
- H) using the pulling cable, the riser is then raised towards the lower mouth of the I-tube,
- I) the abandonment cable is removed from the riser by divers,
- J) using the pulling cable, the riser is raised from below inside the lower mouth of the I-tube,
- K) a bend stiffener of the riser is connected to a lower connector and can be separated from the pulling head. The divers or remote operated vehicles (ROV) verify the distances, the condition of the guides, the insertion of the riser in the I-tube, and eventually free the blocks of the locking lever system, that had been kept open by e.g. inflated balloons or holding cables, and verify the correct engagement of the locking lever,
- L) the riser head is then raised and brought above spider deck level,
- M) the riser head is abutted on the deck by means of a fixing bar,
- N) the pulling system is repositioned for the next riser pull.

The described method is analogously applied both to the flexible riser pulling and fixation on spread-moored FPSO units and on FPSO units with rotatable turret.

Driven by economic advantages and technological constraints, there may be the desire or need to use rigid steel risers or steel catenary risers (SCR) instead of flexible risers.

However the known rigid steel risers are not at all adapted to be coupled to the above described I-tube coupling interface of a floater (FPSO), due to the bending moment constraints brought about by the engagement of the riser termination with an upper bending resistant hang off connecting point (upper balcony or I-tube coupling) and with a lower bending resistant I-tube connecting point (lower balcony or I-tube coupling), which would make the significantly stiffer rigid riser behave like a continuously supported beam rigidly clamped at its free end, and therefore involve excessive cyclic bending stresses both on the riser and on the I-tube interface of the floater. The large motion response of a monohull FPSO vessel caused by the meteo-marine conditions and the limited height of the FPSO vessel, i.e. the relatively short distance between the upper hang off support and the lower I-tube support of the riser termination, increase the stiffness of the connection and the resulting bending moments and lateral/shear forces.

In particular, the connection between the steel catenary riser (SCR) and the floater (FPSO) involves cyclic load transmission between these two bodies, in addition to static loads, resulting in significant bending and transversal loads in and near the interface region between the FPSO and SCR. The dynamic interaction between the riser and the floater is therefore generally complex, and it is desired that the coupling between the rigid steel riser and the I-tube coupling interface of the floater is able to transfer loads avoiding excessive stress levels, stress concentrations and the subsequent fatigue damage.

A further influencing factor is corrosion of the riser material induced by environmental and hydrocarbon product agents, including hydrogen embrittlement phenomena, which contributes to the so called tenso-corrosion, i.e. the combined effect of multiple factors including a high resistant low toughness material, a corrosive environment, tensile stresses above a certain threshold, high temperature variations.

It is noted that the skilled person, faced with excessive bending, transversal and fatigue loads in a structure, due to preset boundary conditions, i.e. the I-tube connection interface, would consider the two standard ways to deal with excessive stresses:
- A) using a more suitable material to resist the higher stresses, e.g. titanium alloy instead of structural carbon steel, or
- B) increasing the resistant cross-section and bending modulus by making the riser stronger all along its riser termination section.

In the present circumstances, the use of titanium alloy instead of structural carbon steel would significantly increase the costs of the risers and a uniform increase of cross-section all along the upper riser termination would lead to possible space violations inside the I-tubes and also increase the cost of the riser.

The aim of the present invention is therefore to propose a new and improved rigid steel riser termination structure and fixation system adapted for connecting steel catenary risers to existing floaters having I-tube and hang-off systems originally designed for flexible risers, and in which the riser is pulled through a lower I-tube up to an upper hang-off area at deck level.

The objective of the invention is achieved by a steel catenary riser upper riser termination and connecting system for connecting the steel catenary riser to an FPSO floater having an I-tube connecting interface with an upper (deck level) hang off seat defining an upper hang off axis and a lower I-tube arranged at a vertical distance below the upper hang off seat and defining a lower I-tube entrance axis.

In accordance with an aspect of the invention, a riser termination 7 is provided for connecting a steel catenary riser duct 2 to an I-tube or J-tube connecting interface of a floating unit 3, said connecting interface comprising:
- a lower tubular coupling recipient 4 (I-tube) installed on the floating unit 3 at a lower riser coupling level 5 and adapted to receive a coupling adapter 6 of a riser termination of a riser duct,
- a locking mechanism 18 provided at the lower coupling recipient 4 for locking the coupling adapter 6 against downward withdrawal from the lower coupling recipient 4,
- an upper hang off seat 19 installed on the floating unit 3 at an upper riser coupling level 21 above the lower riser coupling level 5 and adapted to receive and lock an upper hang off portion of a riser termination, The riser termination 7 comprises:
- an upper hang of portion 22,
- a lower coupling adapter 6,
- a termination conduit 28 in structural steel having an upper conduit end 29 (rigidly) connected to the upper hang off portion 22 and a lower conduit end 30 (rigidly) connected to an adjacent conduit section 31 of the rigid steel riser duct 2 and forming a lower end of the riser termination 7, said termination conduit 28 extending through said coupling adapter 6 and being axially slidable with respect to the coupling adapter 6,
- a bearing structure 32 for supporting the termination conduit 28 within the coupling adapter 6, said bearing structure 32 comprising:
- a circular cylindrical bearing seat 33 formed inside the coupling adapter 6 and defining a bearing seat diameter 34 and a bearing seat axis 35 (being the central symmetry axis of the bearing seat 33),
- an annular rounded bearing body 36 having a bearing body diameter 37 and protruding outward from said termination conduit 28 inside the bearing seat 33,
- wherein the bearing body diameter 37 is smaller than the bearing seat diameter 34 to provide an at least unilateral gap 46 between the bearing body 36 and the bearing seat 33 and allow relative axial sliding along the bearing seat axis 35 and relative rotation at least about the bearing seat axis 35 between the bearing body 36 and the bearing seat 33.

The termination conduit 28 comprises at least one variable cross-section conduit portion 38 having an external diameter 39 and a conduit wall thickness 40 both decreasing in a direction away from the bearing body 36.

The combination of the described bearing structure and the described variable cross-section of the termination conduit 28 allow the riser termination 7 to bend naturally inside and around the lower tubular coupling recipient 4 (I-tube), without clashing with the I-tube, and allowing the entrance angle of the riser 2 being compliant with the riser termination 7.

The system does not require any gap compensation between the bearing body 36 and bearing seat 33, on the contrary the gap is expressly provided and maintained, and does not involve any requirement of a straight riser termination 7, on the contrary the riser termination is elastically bent and is planned to remain bent during use.

The lateral loads and bending stresses on the riser 2 and on the I-tube connection interface are kept within acceptable limits. The economical advantages of rigid steel risers can be more extensively exploited. There is also an improvement of safety at work, as "riser pull into I-tube" installation methods without diver interventions can be used.

The use of structural steel conduits increases also the reliability/cost balance due to the extensive knowledge and modelling precision of fatigue phenomena, material properties, welding procedures of structural steel compared to other materials, such as e.g. titanium alloys.

Moreover, the risk of galvanic corrosion due to the use of dissimilar conductive materials is reduced.

BRIEF DESCRIPTION OF THE FIGURES

These and other features and advantages of the present invention shall be made apparent from the accompanying drawings which illustrate embodiments of the invention, and, together with the general description of the invention given above, and the detailed description of the embodiments given below, serve to explain the principles of the present invention.

FIG. 6 is a side view of a disassembled upper riser termination according to an embodiment of the invention, FIG. 7 is a perspective view of a lower coupling portion of the upper riser termination in FIG. 6, FIG. 8 is an exploded perspective view of a bolted flange connection between to portions of the upper riser termination in in FIG. 6, FIG. 9 is a perspective view of an upper hang off portion of the upper riser termination in FIG. 6, FIG. 15 is a perspective view of the disassembled upper riser termination in FIG. 14, FIGS. 16 and 17 are enlarged views of details of the upper riser termination in FIG. 15, FIG. 18 is a side view of the steel catenary riser upper riser termination installed in the I-tube connection interface of the FPSO vessel, according to an embodiment.

DETAILED DESCRIPTION OF THE INVENTION

Figure 1:
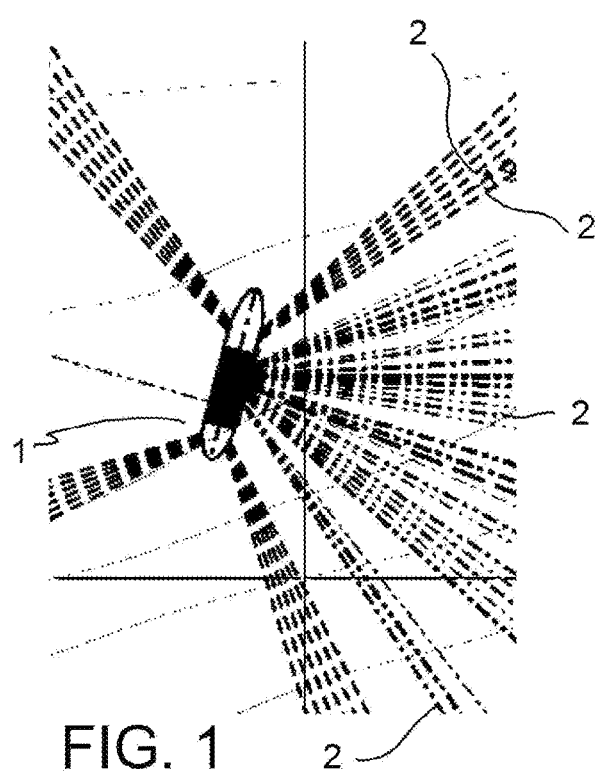
FIG. 1 illustrates a spread moored FPSO floating unit with submerged riser balcony and a number of connected riser ducts.
Figure 3:
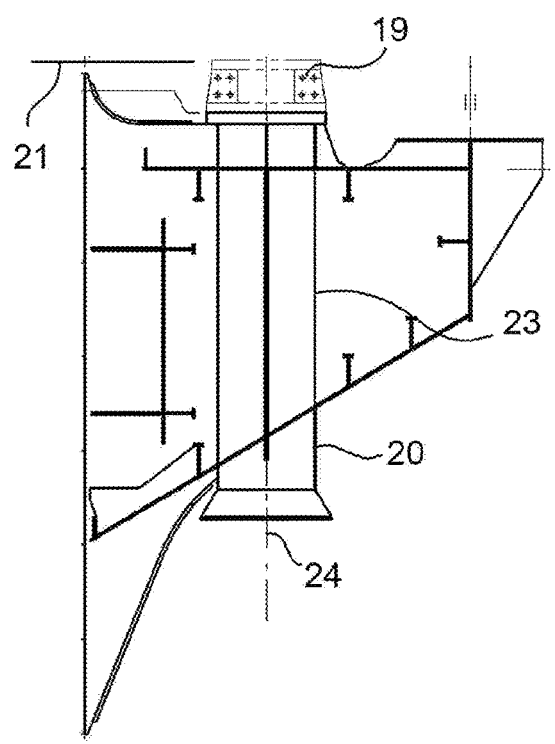
FIG. 3 is a side view of the upper hang off seat on top of an upper I-tube of the I-tube connection interface.
Figure 2:
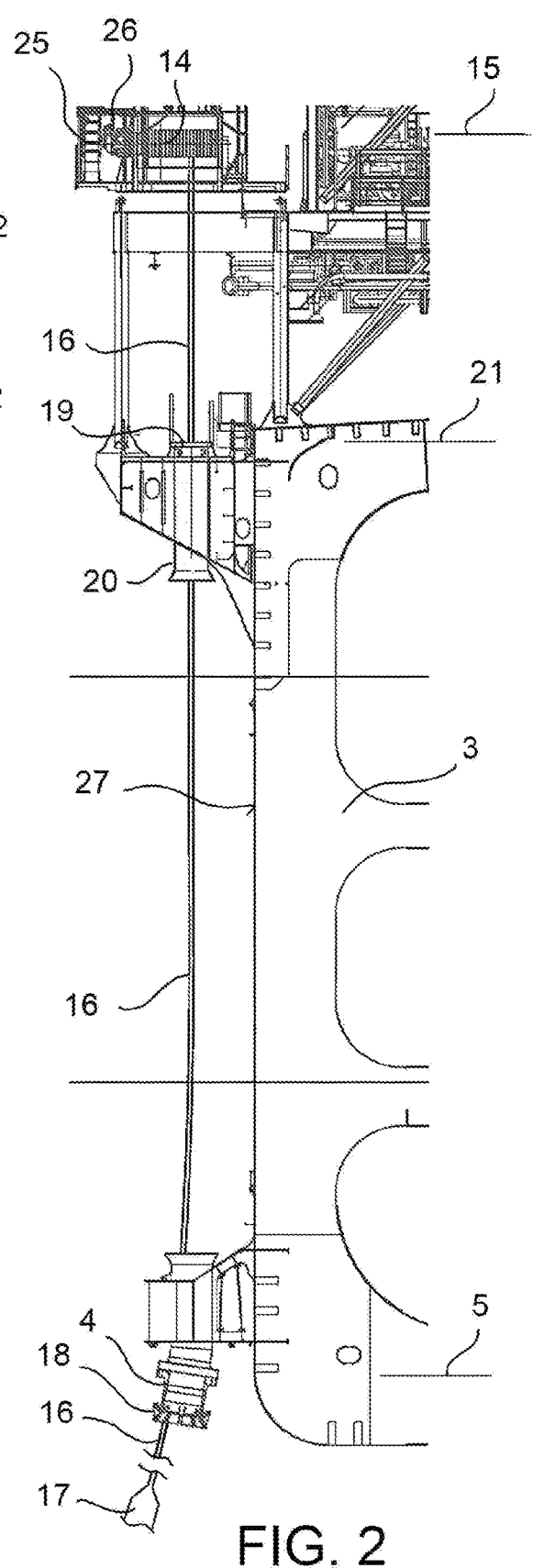
FIG. 2 shows a side wall of the floating unit with a riser pulling equipment, an upper hang off seat, a lower I-tube balcony and a pulling line (but no riser) in a phase of installation of a riser FPSO connection.
Figure 4:
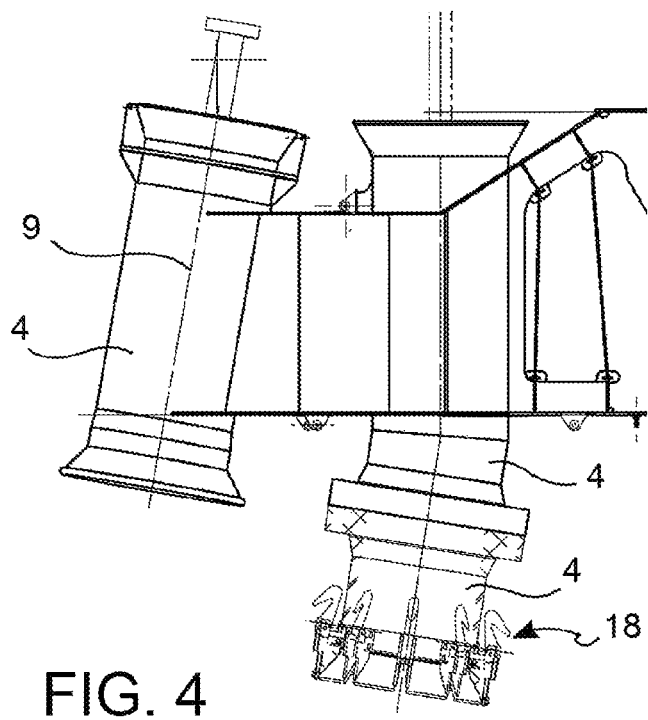
FIG. 4 is a side view of the lower balcony with a lower J-tube with a tilted entrance bell mouth facing downward and with a lower I-tube, of the I-tube connection interface.
Figure 5:
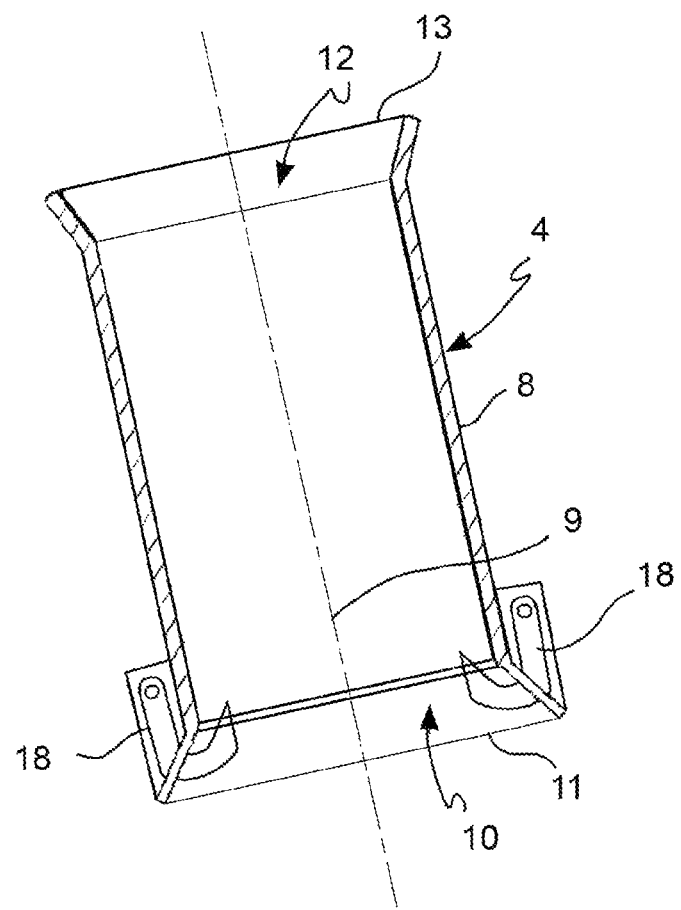
FIG. 5 is a cross sectional view of an exemplary I-tube coupling recipient of the lower I-tube of the I-tube connection interface.
Figures 10, 11, 12:
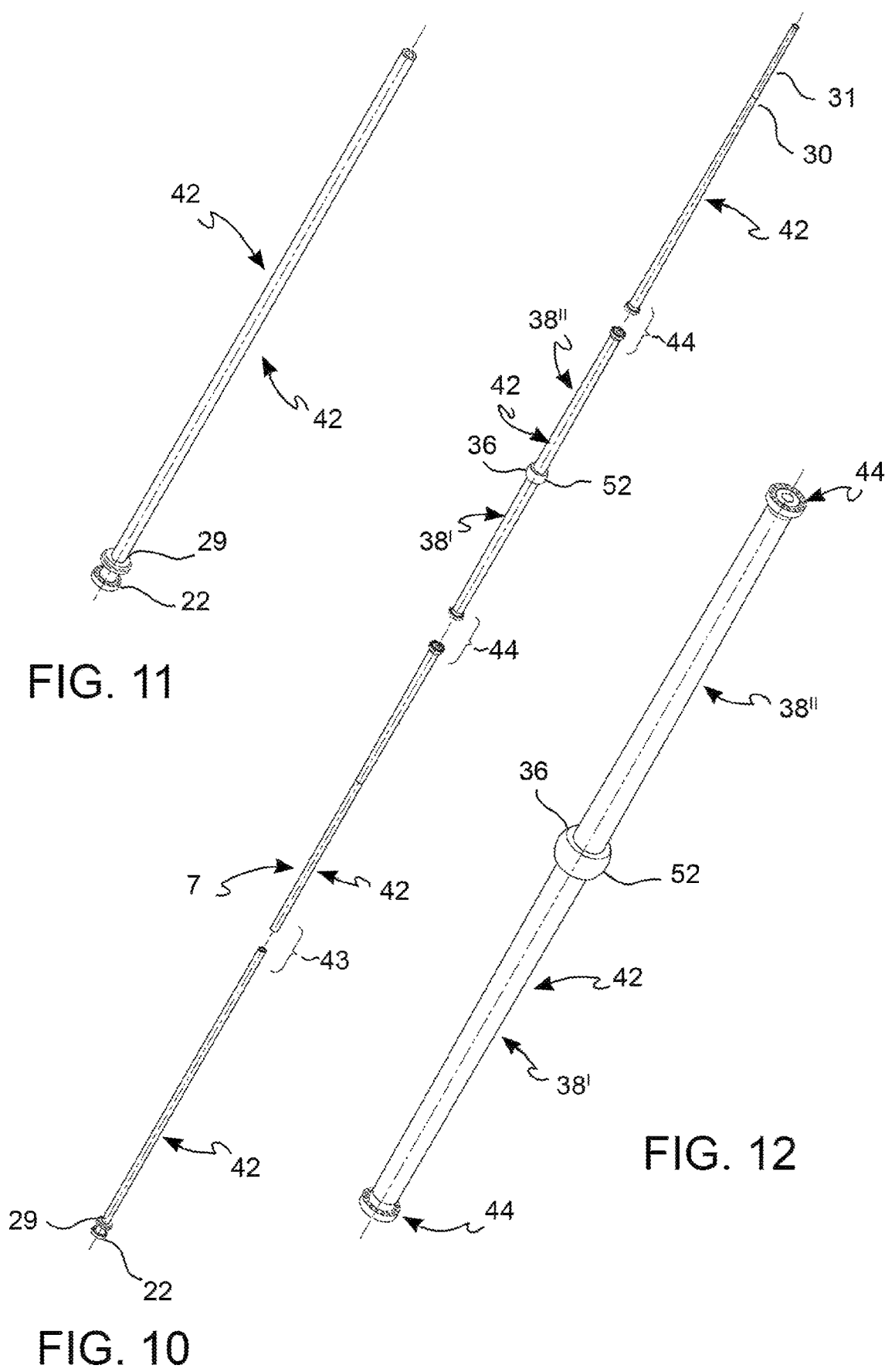
FIG. 10 is a perspective view of a disassembled upper riser termination in accordance with an embodiment of the invention.
FIGS. 11 and 12 are enlarged views of details of the upper riser termination in FIG. 10.
Figure 13:
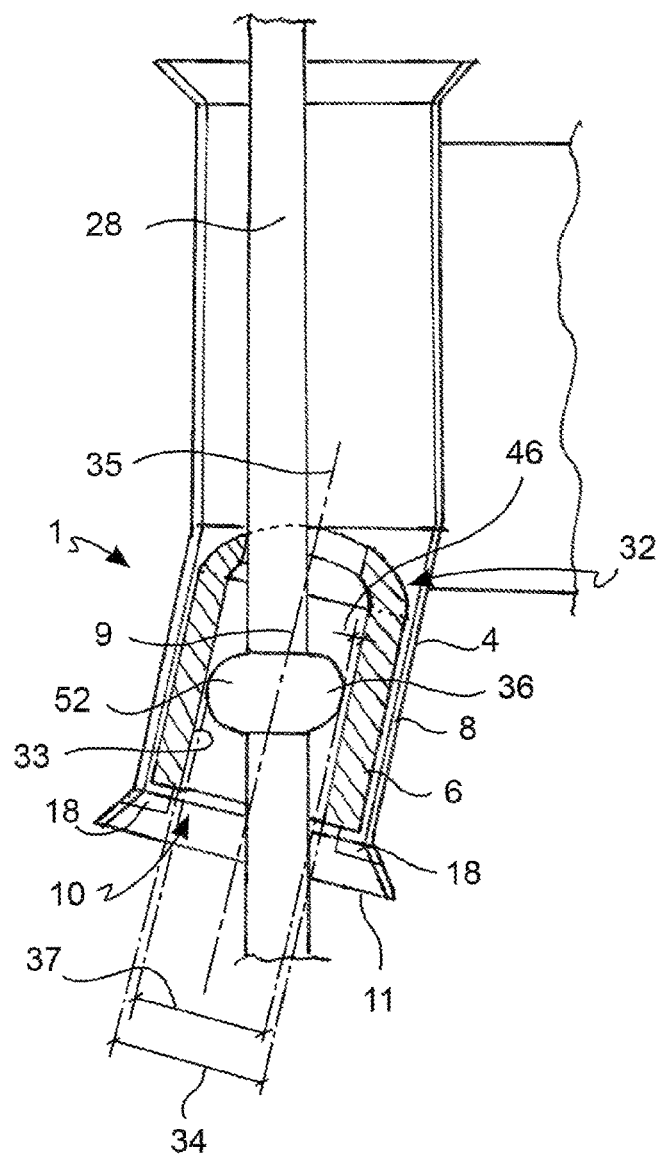
FIG. 13 is a sectional view of a lower coupling portion, including a part-spherical portion, of the upper riser termination, in which the lower coupling portion and a bearing structure are received inside a lower I-tube coupling recipient of the I-tube connection interface, in accordance with an embodiment of the invention.
Figure 14:
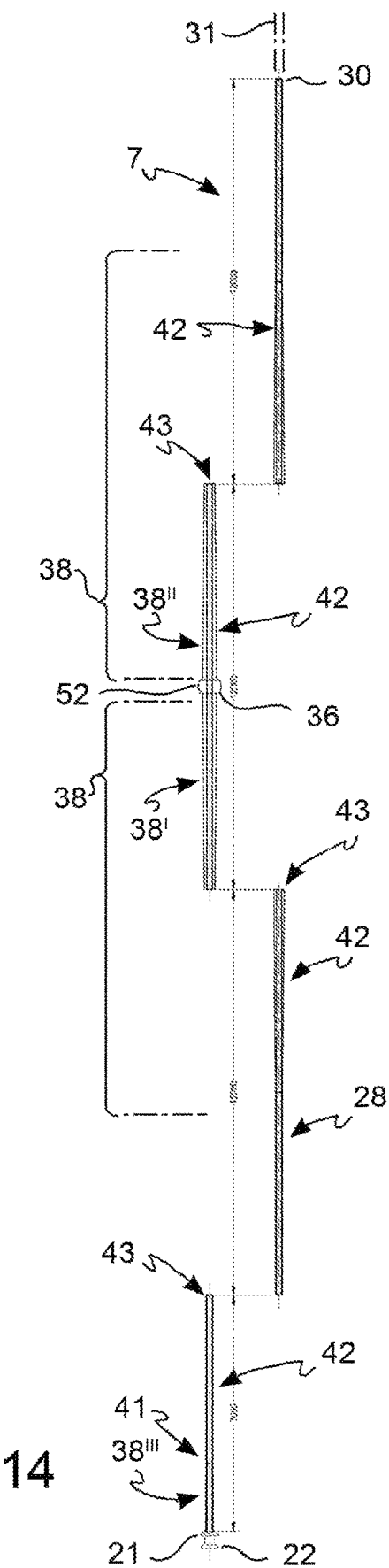
FIG. 14 is a side view of a disassembled upper riser termination according to an embodiment of the invention.

With reference to the figures, a system 1 for connecting an off shore riser duct 2 to a floating unit FPSO 3 comprises a lower tubular coupling recipient 4 (I-tube) installed on the floating unit 3 at a lower riser coupling level 5 and adapted to receive a coupling adapter 6 of an upper riser termination 7 of said riser duct 2, said coupling recipient 4 having an annular side wall 8 extending about a recipient longitudinal axis which defines a lower riser entrance axis 9, a downward facing lower opening 10 defined by a (preferably outwardly flared) lower end edge 11 of the side wall 8, forming a so called bell mouth, an upward facing upper opening 12 defined by a (preferably outwardly flared) upper end edge 13 of the side wall 8.

The system 1 further comprises a locking mechanism 18 provided at the lower coupling recipient 4 for locking the coupling adapter 6 of the upper riser termination 7 against downward withdrawal from the lower coupling recipient 4, The system 1 further comprises a pulling device 14 installed on the floating unit 3 at a pulling device level 15 above said riser coupling level 5 and adapted to pull a pulling line 16 (FIG. 1) extended through the lower coupling recipient 4, wherein the pulling line 16 is intended to be coupled to a pulling head 17 at the upper riser termination 7 of the riser duct 2, so that the upper riser termination 7 is pulled from below upward into the lower coupling recipient 4.

The system 1 further comprises an upper hang off seat 19 installed on the floating unit 3 at an upper riser coupling level 21 (below the pulling device level 15 and above the lower riser coupling level 5) and adapted to receive and lock an upper hang off portion 22 of the upper riser termination 7.

The upper hang off seat 19 defines un upper hang off axis 24 which determines the orientation of the locked upper hang off portion 22 of the riser termination 7.

The upper riser termination 7 comprises:
the upper hang of portion 22,
the lower coupling adapter 6,
a termination conduit 28 in structural steel having an upper conduit end 29 (rigidly) connected to the upper hang off portion 22 and a lower conduit end 30 (rigidly) connected to an adjacent conduit section 31 of the rigid steel riser duct 2 and forming a lower end of the riser termination 7, said termination conduit 28 extending through said coupling adapter 6 and being axially slidable with respect to the coupling adapter 6,
a bearing structure 32 for supporting the termination conduit 28 within the coupling adapter 6, said bearing structure 32 comprising:
a circular cylindrical bearing seat 33 formed inside the coupling adapter 6 and defining a bearing seat diameter 34 and a bearing seat axis 35 (being the central symmetry axis of the bearing seat 33),
an annular rounded bearing body 36 having a bearing body diameter 37 and protruding outward from said termination conduit 28 inside the bearing seat 33,
wherein the bearing body diameter 37 is smaller than the bearing seat diameter 34 to provide an at least unilateral gap 46 between the bearing body 36 and the bearing seat 33 and allow relative axial sliding along the bearing seat axis 35 and relative rotation at least about the bearing seat axis 35 between the bearing body 36 and the bearing seat 33.

The termination conduit 28 comprises at least one variable cross-section conduit portion 38 having an external diameter 39 and a conduit wall thickness 40 both decreasing in a direction away from the bearing body 36.

The combination of the described bearing structure and the described variable cross-section of the termination conduit 28 allow the riser termination 7 to bend naturally inside and around the lower tubular coupling recipient 4 (I-tube), without clashing with the I-tube, and allowing the entrance angle of the riser 2 being compliant with the riser termination 7.

The lateral loads and bending stresses on the riser 2 and on the I-tube connection interface are kept within acceptable limits. The economical advantages of rigid steel risers can be more extensively exploited. There is also an improvement of safety at work, as "riser pull into I-tube" installation methods without diver interventions can be used.

The use of structural steel conduits increases also the reliability/cost balance due to the extensive knowledge and modelling precision of fatigue phenomena, material properties, welding procedures of structural steel compared to other materials, such as e.g. titanium alloys.

The system does not require any gap compensation between the bearing body 36 and bearing seat 33, on the contrary the gap is expressly provided and maintained, and does not involve any requirement of a straight riser termination 7, on the contrary the riser termination is bent and is planned to remain bent during use.

Detailed Description of the Bearing Structure 32

In accordance with an embodiment, the bearing body 36 forms a bearing ball 52 (in other words: an external spherical surface being interrupted (only) at the regions of penetration of the termination conduit 28) which can contact the cylindrical bearing seat 33 always only in a (localized) point (contact region) and provides together with the bearing seat 33 a universal joint with a predetermined play due to the gap 46.

The bearing ball 45 can be made of forged steel and directly machined to the termination conduit 28 or connected to the termination conduit 28 by bolts, by forging, by welding or by heat shrinking.

The bearing seat 33 can be formed directly at the coupling adapter 6 or by a tubular bearing insert fixed inside the coupling adapter 6.

The bearing ball 52 and the bearing seat 33 can transfer only lateral loads, i.e. loads orthogonal to the bearing seat axis 35, thereby allowing some rotational freedom of the riser termination 7 at the tubular coupling recipient 4 (lower I-tube). This would tend to increase the clamping moment and bending stresses at the upper hang off portion 22, which are however kept within acceptable limits thanks to the described cross-section variations of the termination conduit 28.

The external spherical surface of the bearing ball 52 as well as an internal surface of bearing seat 33 can be made wear resistant by surface hardening treatment and/or wear resistant lining and/or low friction treatment or low friction lining.

Detailed Description of the Termination Conduit 28

According to an embodiment, the termination conduit 28 comprises a first variable cross-section conduit portion 38' having an external diameter 39 and a conduit wall thickness 40 both decreasing in a direction away from the bearing body 36, said first variable cross-section conduit portion 38' extending from the bearing body 36 towards the upper hang off portion 22, thereby adapting the cross-section bending resistance to the bending moment function along the conduit length.

Advantageously, the first variable cross-section conduit portion 38' has a continuously tapered shape over at least a first taper length.

Alternatively, the first variable cross-section conduit portion 38' has a stepwise decreasing cross-section-shape or a combined continuously tapered and stepwise decreasing cross-section-shape, thereby adapting the cross-section bending resistance to the bending moment function along the conduit length.

In accordance with an advantageous embodiment, the first variable cross-section conduit portion 38' has a gradually and/or step-wise decrease of the conduit outer diameter 39 and the conduit wall thickness 40 over a first taper length and in which near the bearing body 36 the conduit outer diameter 39 and the conduit wall thickness 40 are maximum and near the upper hang off portion 22 the conduit outer diameter 39 and the conduit wall thickness 40 are minimum.

This provides a relatively low bending stiffness of the riser end termination 7 near the upper hang off portion 22 so that the clamping moment and the bending stresses at the upper hang off point are kept within acceptable limits.

Alternatively or in addition, the termination conduit 28 comprises a second variable cross-section conduit portion 38" having an external diameter 39 and a conduit wall thickness 40 both decreasing in a direction away from the bearing body 36, said second variable cross-section conduit portion 38" extending from the bearing body 36 towards the lower conduit end 30, thereby adapting the cross-section bending resistance to the bending moment function along the conduit length.

Advantageously, the second variable cross-section conduit portion 38" has a continuously tapered shape over a second taper length that is greater than one fifths of the distance between the bearing body 36 and the upper hang off portion 22.

Alternatively, the second variable cross-section conduit portion 38" has a stepwise decreasing cross-section-shape or a combined continuously tapered and stepwise decreasing cross-section-shape, thereby adapting the cross-section bending resistance to the bending moment function along the conduit length (downward).

Advantageously, the termination conduit 28 comprises both the first variable cross-section conduit portion 38' and the second variable cross-section conduit portion 38", so that the conduit outer diameter 39 and the conduit wall thickness 40 both decrease from the bearing body 36 towards the upper hang off portion 22 and from the bearing body 36 towards the lower conduit end 30.

This adapts the conduit cross-section bending resistance to the bending moment function of the riser termination 7 behaving like a continuously supported beam, thereby avoiding excessive bending near the tubular coupling recipient and keeping the bending stresses below critical fatigue thresholds.

In accordance with a further embodiment, the termination conduit 28 comprises a third variable cross-section conduit portion 42 having an external diameter 39 and a conduit wall thickness 40 both decreasing in a direction away from the upper hang off portion 22, said third variable cross-section conduit portion 42 extending from the upper hang off portion 22 towards a region of locally minimum bending resistance 41 of the termination conduit 28 between the upper hang off portion 22 and the bearing body 36, thereby providing an increased bending resistance near the hang off region and influencing the deformation function of the riser termination 7 to adapt best to the vessel wall shape and I-tube connecting interface geometry.

The termination conduit 28 comprises a plurality of individual conduit modules 42 which are connected together by welded connections 43 or by bolted flange connections 44.

In an exemplary embodiment, the termination conduit 28 is made of standard wall thickness carbon steel fine grain size and has a thin internal layer of corrosion resistant alloy (CRA), e.g. Inconel.

In a further exemplary embodiment, the termination conduit 28 can be made of heavy wall high grade carbon steel and a thin internal layer of corrosion resistant alloy, e.g. Inconel.

For applications in which the inner wall surface is provided corrosion resistant alloy (CRA) to resist chemical attack from corrosive inner fluids, the most recommended method for CRA application is weld overlay deposit.

The external surface of the termination conduit 28 may be lined by a protective coating (e.g.: thermal spray Aluminum TSA, polymeric coating, etc.) that provides corrosion protection, as well as protection against abrasion during installation.

Detailed Description of the Upper Hang Off Seat 19 and Upper Hang Off Portion 22

The upper hang off seat 19 can be associated to an upper I-tube 20 or formed as an upper end portion of the upper I-tube 20 and configured e.g. such as a conventional upper hang off seat for fixation of flexible risers, e.g. a flange with holes for a bolted flange connection. Likewise, the upper hang off portion 22 of the upper riser termination 7 can be shaped e.g. similar to a conventional upper hang off portion of a flexible riser, e.g. a flange with holes for a bolted flange connection.

The upper I-tube 20 can have an annular side wall 8 extending about a (preferably but not necessarily vertical) upper hang off axis 24, a downward facing lower opening 25 defined by a (preferably outwardly flared) lower end edge 26 of the side wall 23.

Detailed Description of the Lower Coupling Recipient 4

The lower tubular coupling recipient 4 (I-tube) can be formed by a substantially straight tubular body, in which the recipient longitudinal axis 9 forms a lower riser entrance axis 9.

Alternatively, the lower tubular coupling recipient 4 (I-tube) can be formed by a bent tubular body having a section, the so-called bell mouth, defining the lower riser entrance axis 9 and an upper section that has a longitudinal orientation inclined with respect to the riser entrance axis.

The lower riser entrance axis 9 of the lower coupling recipient 4 can be inclined towards the vessel side wall 27 or away from the vessel side wall 27.

Advantageously, the lower riser entrance axis 9 is inclined with respect to the upper riser hang off axis 9', e.g. of about 7° or about 9°.

The vessel side wall 27 can be a stationary wall of the floating unit 3 or, alternatively, a side wall of a rotating tower (or turret) of the floating unit 3.

The lower coupling recipient 4 is preferably made in steel and possibly weld connected to the floating unit 3.

Detailed Description of the Locking Mechanism 18

In accordance with embodiments, the locking mechanism 18 comprises a lever-hook mechanism connected to the lower coupling recipient 4 and engageable with and detachable from the coupling adapter 6 positioned inside the coupling recipient 4.

The locking mechanism 18 can be arranged at least partially, possibly completely, inside the coupling recipient 4, or fixed on an external surface of the coupling recipient 4 with hooking portions adapted to move from outside to inside the coupling recipient 4 and back to engage and disengage the coupling adapter 6 inserted inside the coupling recipient 4.

Preferably, the locking mechanism 18 extends in a lower two third, in a lower half or in a lower third of the longitudinal extension of the coupling recipient 4. This is conveniently close to the lower end edge 13 that constitutes a critical point that must not be hit by the upper riser termination 7 during its movements.

The locking mechanism 18 can be self-triggering upon insertion of the coupling adapter 6 into the coupling recipient 4 or it can be activated by remote control.

Detailed Description of the Pulling Device 14

The pulling device 14 may comprise one or more motor driven pulling winches 25 adapted to wind on and off an upper portion of the pulling line 16, as well as possibly one or more deviating surfaces, e.g. pulleys, and locking devices 26 adapted to stop and secure the pulling device 14 and, hence, the pulling line 16 in a desired position.

In accordance with embodiments, the pulling device 14 or the pulling winch 25 is displaceable, e.g. slidable, to a plurality of different pulling positions above a plurality of different of said coupling recipients 4.

Detailed Description of the Riser Duct 2

In accordance with an embodiment, the riser duct 2 is a rigid steel riser duct with the upper riser termination 7 which includes or is connectable to a pulling head 17, e.g. by the upper hang off portion 22.

The upper hang off portion 22 is made of forged steel with a neck and ending in a bolt receiving flange, e.g. an API standard flange. The neck has the function to transfer axial riser top loads to FPSO upper hang off seat 19 through a split flange. The API flange is used to:
  connect the pulling head 17 to allow a pulling line 16 connection for the riser installation, and to allow temporary connection of the coupling adapter 6, and
  connect an FPSO hard pipe or spool duct 28 to the steel riser duct to allow liquid content flow after installation completion.

Detailed Description of the Method

With reference to the figures, a method for approximating and connecting an off shore riser duct 2 to a floating unit FPSO 3 comprises:
  providing a tubular lower coupling recipient 4 (I-tube) on the floating unit 3 at a riser coupling level 5, said coupling recipient 4 having an annular side wall 8 extending around a recipient longitudinal axis forming a riser lower entrance axis 9,
  positioning a pulling device 14 on the floating unit 3 at a pulling device level 15 above said riser coupling level 5 and using the pulling device 14 to pull a pulling line 16 extended through the coupling recipient 4 and connected to a pulling head 17 at an upper riser termination 7 of the rigid steel riser duct 2, so that the upper riser termination 7 of the rigid steel riser duct 2 is pulled from below upward into the coupling recipient 4,
  providing a locking mechanism 18 at the lower coupling recipient 4 and using the locking mechanism 18 for locking a coupling adapter 6 of the upper riser termination 7 against downward withdrawal from the coupling recipient 4,
  after locking the coupling adapter 6 in the coupling recipient 4, receiving and locking an upper hang off portion 22 of the riser termination 7 at an upper hang off seat 19 of the floating unit 3 at an upper riser coupling level 21 below the pulling device level 15 and above the lower riser coupling level 5,
  supporting a termination conduit 28 of the upper riser termination 7 within the coupling adapter 6 by means of the above described bearing structure 32,
  detaching the pulling line 16, e.g. a steel pulling cable, from the upper riser termination 7 of the rigid steel riser 2,
  connecting a spool duct 28 (or pipe connection socket) to the riser termination 7 of the rigid steel riser duct 2 for making a permanent hydraulic connection between the rigid steel riser duct 2 and an onboard oil or gas plant of the floating unit 3.

While the present invention has been illustrated by description of several embodiments and while the illustrative embodiments have been described in considerable detail, it is not the intention to restrict or in any way limit the scope of the appended claims to such detail. Additional advantages and modifications may readily appear to those skilled in the art.

The invention claimed is:

1. A riser termination for connecting a steel catenary riser duct to an I-tube or J-tube connecting interface of a floating unit, said connecting interface comprising:
  a lower tubular coupling recipient installed on the floating unit at a lower riser coupling level and adapted to receive a coupling adapter of the riser termination,
  a locking mechanism provided at the lower coupling recipient for locking the coupling adapter against downward withdrawal from the lower coupling recipient,
  an upper hang off seat installed on the floating unit at an upper riser coupling level above the lower riser coupling level and adapted to receive and lock an upper hang off portion of the riser termination,
said riser termination comprising:
  an upper hang off portion,
  a lower coupling adapter,
  a termination conduit in structural steel having an upper conduit end rigidly connected to the upper hang off portion and a lower conduit end connected to an adjacent conduit section of the steel riser duct and forming a lower end of the riser termination, said termination conduit extending through said coupling adapter and being axially slidable with respect to the coupling adapter,
  a bearing structure for supporting the termination conduit within the coupling adapter, said bearing structure comprising:
    a circular cylindrical bearing seat formed inside the coupling adapter and defining a bearing seat diameter and a bearing seat axis,
    an annular rounded bearing body having a bearing body diameter and protruding outward from said termination conduit inside the bearing seat,
  wherein the bearing body diameter is smaller than the bearing seat diameter to provide an at least unilateral gap between the bearing body and the bearing seat and allow relative axial sliding along the bearing seat axis and relative rotation at least about the bearing seat axis between the bearing body and the bearing seat,
  wherein the termination conduit comprises at least one variable cross-section conduit portion having an external diameter and a conduit wall thickness both decreasing in a direction away from the bearing body,
  wherein the bearing body forms a bearing ball and provides together with the bearing seat a universal joint with a predetermined play due to the gap.

2. The riser termination according to claim 1, wherein the bearing ball is made of forged steel and either directly machined to the termination conduit or connected to the termination conduit by one of bolts, forging, welding, and heat shrinking.

3. The riser termination according to claim 1, wherein the bearing seat is formed directly at the coupling adapter or by a tubular bearing insert fixed inside the coupling adapter.

4. The riser termination according to claim 1, wherein at least one of an external spherical surface of the bearing ball and an internal surface of bearing seat are made wear resistant by one of:
surface hardening treatment,
wear resistant lining,
low friction treatment,
low friction coating.

5. The riser termination according to claim 1, wherein the termination conduit comprises a first variable cross-section conduit portion having an external diameter and a conduit wall thickness both decreasing in a direction away from the bearing body, said first variable cross-section conduit portion extending from the bearing body towards the upper hang off portion.

6. The riser termination according to claim 5, wherein the first variable cross-section conduit portion has a continuously tapered shape over a first taper length.

7. The riser termination according to claim 5, wherein the first variable cross-section conduit portion has a stepwise decreasing cross-section shape or a combined continuously tapered and stepwise decreasing cross-section shape.

8. The riser termination according to claim 5, wherein the first variable cross-section conduit portion has a decrease of the conduit outer diameter and the conduit wall thickness over a first taper length between the bearing body and the upper hang off portion, and in which proximate the bearing body the conduit outer diameter and the conduit wall thickness are maximum and proximate the upper hang off portion the conduit outer diameter and the conduit wall thickness are minimum.

9. The riser termination according to claim 1, wherein the termination conduit comprises a second variable cross-section conduit portion having an external diameter and a conduit wall thickness both decreasing in a direction away from the bearing body, said second variable cross-section conduit portion extending from the bearing body towards the lower conduit end.

10. The riser termination according to claim 9, wherein the second variable cross-section conduit portion has a continuously tapered shape over a second taper length that is greater than one fifths of the distance between the bearing body and the upper hang off portion, or between one fifth and one third of the distance between the bearing body and the upper hang off portion.

11. The riser termination according to claim 1, wherein the termination conduit comprises a first variable cross-section conduit portion having an external diameter and a conduit wall thickness both decreasing in a direction away from the bearing body, said first variable cross-section conduit portion extending from the bearing body towards the upper hang off portion; wherein the termination conduit comprises a second variable cross-section conduit portion having an external diameter and a conduit wall thickness both decreasing in a direction away from the bearing body, said second variable cross-section conduit portion extending from the bearing body towards the lower conduit end.

12. The riser termination according to claim 1, wherein the termination conduit comprises a third variable cross-section conduit portion having an external diameter and a conduit wall thickness both decreasing in a direction away from the upper hang off portion, said third variable cross-section conduit portion extending from the upper hang off portion towards a region of locally minimum bending resistance of the termination conduit between the upper hang off portion and the bearing body.

13. The riser termination according to claim 1, wherein the termination conduit comprises a plurality of individual conduit modules which are connected together by welded connections or by bolted flange connections.

14. The riser termination according to claim 1, wherein the termination conduit is made of one of:
standard wall thickness carbon steel fine grain size,
heavy wall high grade carbon steel;
and has a thin internal layer of corrosion resistant alloy or Inconel applied by a weld overlay deposit, and a protective external surface coating.

15. A method for connecting an off-shore steel catenary riser duct to a floating unit floating production storage offloading (FPSO), comprising the steps of:
providing the steel riser duct with an upper riser termination according to-claim 1,
providing a tubular lower coupling recipient on the floating unit at a riser coupling level, said coupling recipient having an annular side wall extending around a recipient longitudinal axis forming a riser lower entrance axis,
positioning a pulling device on the floating unit at a pulling device level above said riser coupling level and using the pulling device to pull a pulling line extended through the coupling recipient and connected to a pulling head at the upper riser termination of the steel riser duct, so that the upper riser termination of the steel riser duct is pulled from below upward into the coupling recipient,
providing a locking mechanism at the lower coupling recipient and using the locking mechanism for locking the coupling adapter of the upper riser termination against downward withdrawal from the coupling recipient,
after locking the coupling adapter in the coupling recipient, receiving and locking the upper hang off portion of the riser termination at an upper hang off seat of the floating unit at an upper riser coupling level below the pulling device level and above the lower riser coupling level,
supporting the termination conduit of the upper riser termination within the coupling adapter by the bearing structure of said riser termination,
detaching the pulling line from the upper riser termination,
connecting a spool duct to the riser termination for making a permanent hydraulic connection between the rigid steel riser duct and an onboard oil or gas plant of the floating unit,
forming the bearing seat directly at the coupling adapter or by a tubular bearing insert fixed inside the coupling adapter.

* * * * *